United States Patent
Sipola

(10) Patent No.: US 6,185,227 B1
(45) Date of Patent: Feb. 6, 2001

(54) METHOD AND PACKET RADIO SYSTEM FOR TRANSMITTING MODULATION AND SIGNALLING INFORMATION

(75) Inventor: Jussi Sipola, Oulu (FI)

(73) Assignee: Nokia Networks Oy, Espoo (FI)

( * ) Notice: Under 35 U.S.C. 154(b), the term of this patent shall be extended for 0 days.

(21) Appl. No.: 09/527,408

(22) Filed: Mar. 16, 2000

Related U.S. Application Data

(63) Continuation of application No. PCT/FI99/00637, filed on Jul. 22, 1999.

(51) Int. Cl.7 .................................................. H04J 3/12
(52) U.S. Cl. ........................... 370/522; 370/527; 370/529
(58) Field of Search ..................................... 370/522, 527, 370/529, 337, 329; 375/231, 233, 340; 455/276.1, 557

(56) References Cited

U.S. PATENT DOCUMENTS

| | | | |
|---|---|---|---|
| 5,155,742 | * 10/1992 | Ariyauisitakul et al. | 375/231 |
| 5,222,101 | * 6/1993 | Ariyavisitakul et al. | 375/231 |
| 5,483,557 | * 1/1996 | Webb | 375/233 |
| 5,509,050 | * 4/1996 | Berland | 455/557 |
| 5,548,834 | * 8/1996 | Suarb et al. | 455/276.1 |
| 5,640,395 | * 6/1997 | Hamalatmen et al. | 370/337 |
| 5,642,354 | * 6/1997 | Spear | 370/329 |
| 5,729,541 | * 3/1998 | Hamalatmen et al. | 370/337 |
| 6,026,130 | * 2/2000 | Rahmatullah et al. | 375/340 |

FOREIGN PATENT DOCUMENTS

| | | |
|---|---|---|
| 0 848 515 | 6/1998 | (EP) . |
| WO 98/07291 | 2/1998 | (WO) . |
| WO 98/21847 | 5/1998 | (WO) . |

OTHER PUBLICATIONS

Copy of International Search Report for PCT/FI99/00637.

* cited by examiner

*Primary Examiner*—Salvatore Cangialosi
(74) *Attorney, Agent, or Firm*—Altera Law Group, LLC

(57) ABSTRACT

The invention relates to a coding method of signalling information in a packet radio system and to a packet radio system, which comprises at least one base station and subscriber terminal, in which signals to be transmitted on a radio connection between the base station and the subscriber terminal form blocks, which comprise bursts consisting of symbols, the burst comprising a training sequence in which modulation information is included. The invention is characterized in that signalling information is coded together with the modulation information relating to the whole block into the training sequences of the block. Coding enables e.g. a higher data transmission rate because it is not necessary to reserve data bits for coding of uplink state flags, for example.

16 Claims, 2 Drawing Sheets

| 300 | 302 | 304 |
|---|---|---|
| DATA | 306 | DATA |
| DATA | 308 | DATA |
| DATA | 310 | DATA |
| DATA | 312 | DATA |

# METHOD AND PACKET RADIO SYSTEM FOR TRANSMITTING MODULATION AND SIGNALLING INFORMATION

This application is a con of PCT/FI99/00637 filed Jul. 22, 1999.

FIELD OF THE INVENTION

The invention relates to a method and packet radio system for transmitting signalling and modulation information in training sequences of a radio system which utilizes packet transmission.

BACKGROUND OF THE INVENTION

A packet radio system refers to a radio system which utilizes packet-switched technology known from fixed networks. Packet switching is a method of establishing a connection between the users by transmitting data in packets, which include address and control information. Several connections may simultaneously use the same transmission connection. Studies have concentrated on the use of packet-switched radio systems, in particular, because the packet switching method is well suited for data transmission where the data to be transmitted is generated in bursts. Thus it is not necessary to reserve the data transmission connection for the whole duration of transmission, but only for transmission of packets. This allows to save costs and capacity considerably both when the network is being constructed and used. When developing the GSM system further (Global System for Mobile Communication), researchers are paying special attention to packet networks, i.e. GPRS (General Packet Radio Service) and a radio system utilizing packet transmission (EGPRS, Enhanced General Packet Radio Service).

One of the main concerns in the design of prior art radio systems has been to guarantee the signal quality also when the channel quality is poor. In the planning of data transmission systems one essential parameter is the modulation method to be used on the transmission path. The information symbols to be transmitted cannot be transmitted as such over the transmission path because of the capacity of the transmission path and losses on it. Instead, the symbols have to be modulated by a suitable method to achieve a satisfying capacity of the transmission path and quality of transmission. In the development of prior art systems and selection of the modulation method the main concern has thus been to guarantee transmission quality, in which case the capacity of the modulation methods in poor channel conditions is important. As a result of this the ability of existing methods to transmit signals having a high data rate is rather poor. Thus it has been necessary to compromise the capacity in order to guarantee the quality of transmission.

An example of prior art modulation methods is GMSK (Gaussian Minimum Shift Keying), which is used in the GSM cellular radio system. It has a narrow frequency spectrum and good capacity, but the data transmission rates are not very high.

One solution to optimization of capacity and transmission rate is to change the modulation method to be used according to the need. When good interference tolerance is required, we can use the GMSK method, for example, and when the channel quality is good, we can employ the 8-PSK method, for example, which allows to achieve a data rate three times higher than that achieved with the GMSK.

The problem related to prior art radio systems is how to change the modulation method smoothly during a continuous connection. Change of the modulation method may cause problems in the receiver, in particular, because the transmitter may change the modulation method without informing the receiver of this in advance. Smooth change of the modulation method is, however, required in transmission of packet-switched data, for instance.

It is known from packet radio systems to transmit blocks consisting of bursts, e.g. four bursts. Packet radio systems employ various burst modulation methods and require a method for identifying the modulation method used on the downlink. Modulation remains the same during one four-burst block. For example, if modulation of one burst is interpreted incorrectly, a fourth of the information included in the block is lost. At most coding rates this prevents reception of the block.

Several subscriber terminals may use the same time slot. A base station transmits an uplink state flag on the downlink. State flags show which subscriber terminal is allowed to transmit signals on the uplink. The time slot can be utilized only if only one subscriber terminal uses it for data transmission. To realize this all subscriber terminals of the time slot should be able to receive uplink state flags without errors. The required detection ability is not dependent on modulation or the data coding rate.

In the GPRS system, for example, the uncoded uplink state flag consists of three bits per each four-burst radio block. An uncoded uplink state flag USF is coded into 6 or 12 bits depending on the data coding ratio, and the bits are interleaved into the data.

BRIEF DESCRIPTION OF THE INVENTION

An object of the invention is to develop a method and a packet radio system implementing the method to solve the above-mentioned problems. This is achieved with the method and packet radio system to be described in the following. The invention relates to a coding method of signalling information in a packet radio system, which comprises at least one base station and subscriber terminal, and in which signals to be transmitted on a radio connection between the base station and the subscriber terminal form blocks, which comprise bursts consisting of symbols, the bursts comprising a training sequence in which modulation information is included. In the method signalling information is coded together with the modulation information relating to the whole block into the training sequences of the block.

The invention also relates to a packet radio system, which comprises at least one base station and subscriber terminal, and in which signals to be transmitted on a radio connection between the base station and the subscriber terminal form blocks, which comprise bursts consisting of symbols, the bursts comprising a training sequence in which modulation information is included. The packet radio system is arranged to code signalling information together with the modulation information relating to the whole block into the training sequences of the block.

Preferred embodiments of the invention are disclosed in the dependent claims.

A training sequence means a group of predetermined symbols which the receiver knows. By comparing a received training sequence by certain methods with a known training sequence the receiver can generate information on what kind of distortions resulting from the non-ideal radio connection between the base station and the subscriber terminal the received signal contains, and using this information the receiver can demodulate the received signal easier.

In other words, the present invention relates to a method and packet radio system for transmitting signalling and modulation information in training sequences of a radio system which utilizes packet transmission. The same modulation is used in each burst of the block, and thus it is not necessary to include modulation information in each training sequence separately. According to the invention, training sequences can thus be used for transmitting signalling information besides modulation information.

In the method according to the invention the training sequence used can be detected e.g. by comparing channel estimates calculated using different training sequences.

The method and system of the invention provide several advantages. The method according to the invention is particularly suitable for coding uplink state flags. Coding is efficient because a large number of symbols are used in coding of uplink state flags. Coding also enables a higher data transmission rate because it is not necessary to reserve data bits for coding uplink state flags, and thus coding saves preferably e.g. three symbols per burst. Coding can be easily implemented in the case of different coding rates and modulations. Thanks to its efficiency, coding also allows to assign the same time slot both to the subscriber terminals close to the base station and to the terminals far away from it.

The advantages of the system according to the invention are the same as those described for the method. It is clear that preferred embodiments and detailed embodiments can be combined with one another to achieve the desired technical effect.

BRIEF DESCRIPTION OF THE DRAWINGS

The invention will be described more closely by means of preferred embodiments with reference to the accompanying drawings, in which.

DETAILED DESCRIPTION OF THE INVENTION

The method of the invention is applicable to any radio system which utilizes digital packet transmission and in which the signals to be transmitted comprise bursts consisting of symbols, the bursts comprising a known training sequence, and in which the bursts are transmitted in blocks. The invention is preferably applicable to networks which are developed from GSM-based cellular radio networks and in which data is transmitted using a packet radio service (EGPRS, Enhanced General Packet Radio Service). In that case data is transmitted in packets.

Figure 1:
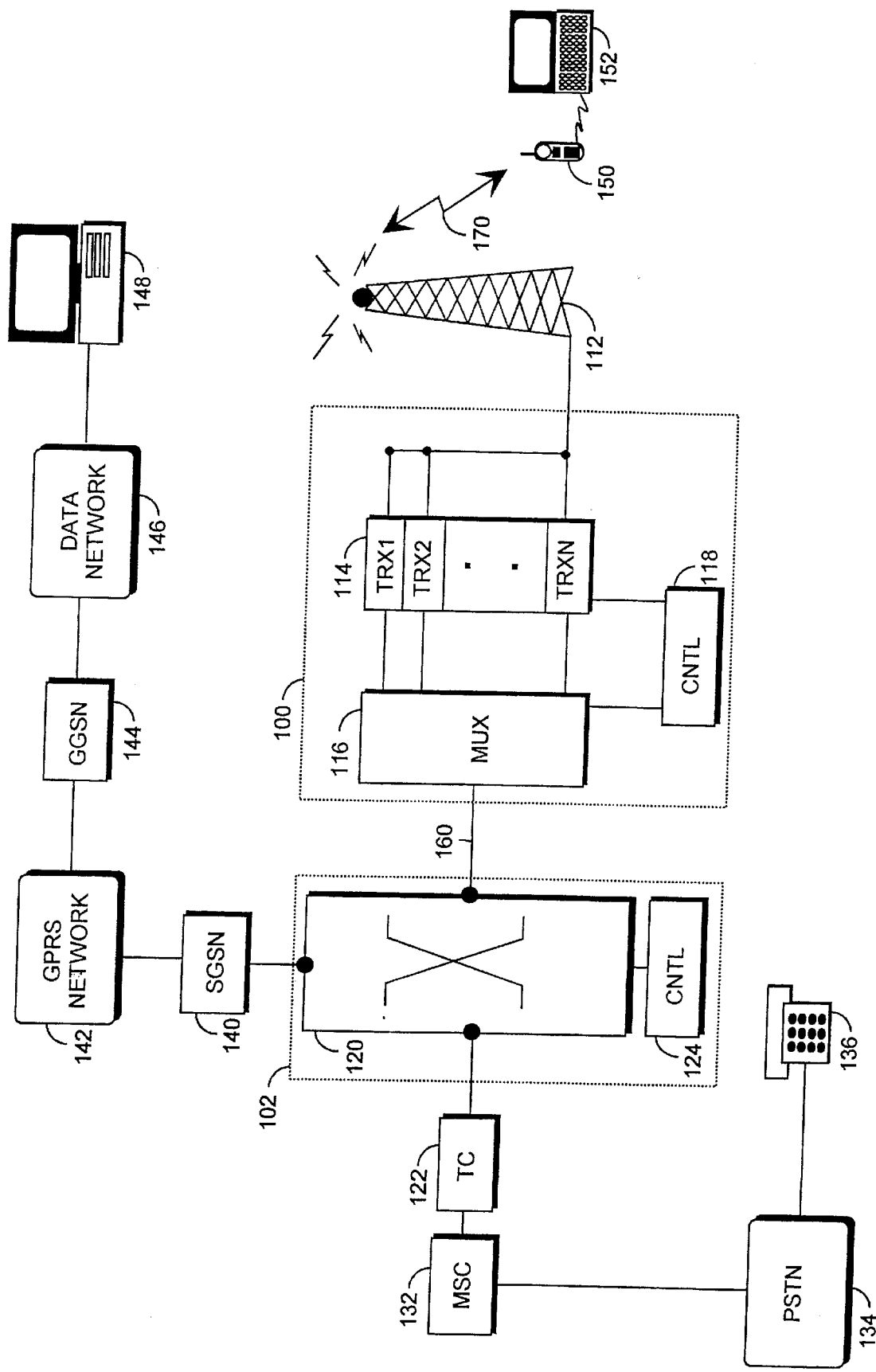
FIG. 1 is a block diagram of a cellular radio network, illustrating how a base station and a base station controller are connected to a packet transmission network.

A typical structure of a cellular radio network according to the invention and its connections to a switched telephone network and packet transmission network will be described with reference to FIG. 1. FIG. 1 includes only elements relevant to describing the invention, but it will be obvious to a person skilled in the art that a conventional cellular radio network also comprises other functions and structures which need not be explained more closely here.

The cellular radio network comprises a network part 100, 102, 132, 140 and a subscriber terminal 150. The network part 100, 102, 132, 140 includes base stations 100. Between the base stations 100 and the subscriber terminal 150 there is a bi-directional radio connection 170, on which a radio signal is transmitted at a certain carrier frequency. The subscriber terminals 150 may be fixed, placed in a vehicle or portable. Several base stations 100 are controlled centrally by a base station controller 102 which is in contact with the base stations. The base station 100 comprises transceivers 114. A base station 100 typically comprises from one to sixteen transceivers 114. One transceiver 114 provides radio capacity for one TDMA frame, i.e. typically for eight time slots.

The base station 100 comprises a control unit 118, which controls the function of the transceivers and a multiplexer 116. The multiplexer 116 is used for placing the traffic and control channels used by several transceivers 114 on one transmission connection 160. The structure of the transmission connection 160 is strictly defined, and is called an Abis interface. The transmission connection 160 is typically implemented using a connection of 2 Mbit/s, i.e. a PMC link (Pulse Coded Modulation).

There is a connection from the transceivers 114 of the base station 100 to an antenna unit 114, which is used for implementing a bi-directional radio connection 170 to the subscriber terminal 150. The bi-directional radio connection 170 is employed for establishing a connection and for packet transmission. The structure of frames to be transmitted on the bi-directional radio connection 170 is also strictly defined, and is called an air interface.

The subscriber terminal 150 may be a normal GSM mobile station to which e.g. a portable computer 152 can be connected using an expansion card. The computer can be used for subscribing to and processing of packets in packet transmission. Protocol processing may be located in the subscriber terminal 150 and/or in the computer 152 connected to the subscriber terminal 150.

The base station controller 102 establishes a connection to the subscriber terminal 150 by requesting the base station 100 to send a message to the subscriber terminal 150 for establishing the connection. The base station controller 102 comprises a group switching field 120 and a control unit 124. The group switching field 120 is used for connecting speech and data and for connecting signalling circuits. The base station subsystem BSS formed by the base station 100 and the base station controller 102 also comprises a transcoder, i.e. a speech codec called TRAU (Transcoder and Rate Adapter Unit) 122. The transcoder 122 is typically located as close to a mobile services switching centre 132 as possible because speech can thus be transmitted in the format of the cellular radio network between the transcoder 122 and the base station controller 102, which allows to save transmission capacity.

The transcoder 122 converts the different digital coding formats of speech used between the public switched telephone network and the mobile telephone network into compatible formats, e.g. from the format of the fixed network (64 kbit/s) into a format of the cellular radio network (e.g. 13 kbit/s) and vice versa. The control unit 124 is responsible for call control, mobility management, collection of statistical information and signalling.

As is seen in FIG. 1, the group switching field 120 can be used for establishing connections (illustrated with black dots) both to the public switched telephone network (PSTN) 134 via the mobile services switching centre 132 and to the packet transmission network 142. In the public switched telephone network 134 the typical terminal 136 is a conventional telephone or an ISDN telephone (Integrated Services Digital Network).

The connection between the packet transmission network 142 and the group switching field 120 is established by a support node 140 (SGSN=Serving GPRS Support Node). The support node 140 is responsible for transmitting packets between the base station system and a gateway support node 144 (GGSN=Gateway GPRS Support Node) and keeping a record of the location of the subscriber terminal 150 in its area.

The gateway support node 144 connects a public packet transmission network 146 and the packet transmission network 142. At the interface it is possible to use e.g. an Internet protocol or X.25 protocol. The gateway support node 144 conceals the internal structure of the packet transmission network 142 from the public packet transmission network 146 by encapsulating the structure, and thus the public packet transmission network 146 regards the packet transmission network 142 as a sub-network, to the subscriber terminal 150 of which the public packet transmission network 146 can assign packets and receive packets from it.

The packet transmission network 142 is typically a private network which uses an Internet protocol and carries signalling and tunneled user data. The structure of the network 142, i.e. both its architecture and protocols, may vary according to the operator below the Internet protocol layer.

The public packet transmission network 146 may be e.g. the global Internet network. A terminal 148, e.g. a server computer, which is in contact with the network wants to transmit packets to the subscriber terminal 150.

A portable computer 152 is connected to the subscriber terminal 150. The data to be transmitted is carried from the portable computer 152 to the server computer 148. Naturally, data can also be transmitted in the opposite transmission direction, i.e. from the server computer 148 to the portable computer 152. Data is carried through the system at the air interface 170, from the antenna 112 to the transceiver 114 and therefrom along the transmission connection 160 to the group switching field 120 in multiplexed form provided in the multiplexer 116. In the group switching field a connection has been established to the output towards the support node 140, from which the data is supplied in the packet transmission network 142 via the gateway support node 144 to the server computer 148 connected to the public packet transmission network 146.

Figure 2:
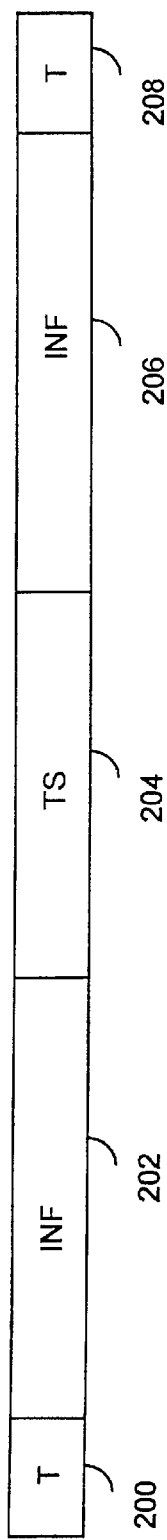
FIG. 2 shows the structure of a normal GSM burst, in the middle of which there is a training sequence.

In digital radio systems it is possible to provide the signal bursts with a predetermined symbol sequence, i.e. a training sequence, which can be used for calculating the impulse response, for example. FIG. 2 illustrates, by way of example, a normal burst of the digital GSM cellular radio system. The normal burst of the GSM system comprises symbols, which comprise bits or bit combinations. The symbols of the bursts are divided into sequences which comprise start symbols 200, information symbols 202, training symbols 204, information symbols 206 and stop symbols 208.

In the following we shall examine the method according to the invention. It can be used in a digital radio system which utilizes packet transmission for signalling between the base station 112 and the subscriber terminal 150. The signals to be transmitted on the radio connection 170 between the base station 112 and the subscriber terminal 150 comprise bursts consisting of symbols, and the bursts comprise a known training sequence 204. If there are two different training sequences 204 for the connection 170 between the base station 112 and the subscriber terminal 150, the symbol indicating the data to be transmitted may have two different values, e.g. 0 and 1. If more than two different training sequences 204 are used, the symbol indicating the data to be transmitted may receive as many different values as there are training sequences 204 available. The method of the invention is characterized in that the training sequence is not completely known; instead, there are several alternatives. One training sequence of a known group of training sequences is used as the training sequence, but it is unknown which sequence this is.

It is previously known to include modulation information in the training sequences 204 included in the bursts, i.e. to transmit information on modulation used in the training sequences 204. In the method according to the present invention the same modulation is used for the whole block. The modulation information is preferably coded only into some training sequences and signalling is preferably coded into the other training sequences. Different bursts of the block may comprise a different number of training sequence alternatives 204.

Each training sequence can comprise $\log_2 n$ bits of information. Here n means the number of available training sequence alternatives. According to the most preferred embodiment, three training sequences are used for transmitting block-coded uplink state flags. The structure of the block code is determined by variable n, i.e. the structure depends on the number of different training sequences available. In that case each training sequence is one of the predetermined alternatives. For example, if n=2, a three-bit USF can be transmitted without coding.

Figure 3:
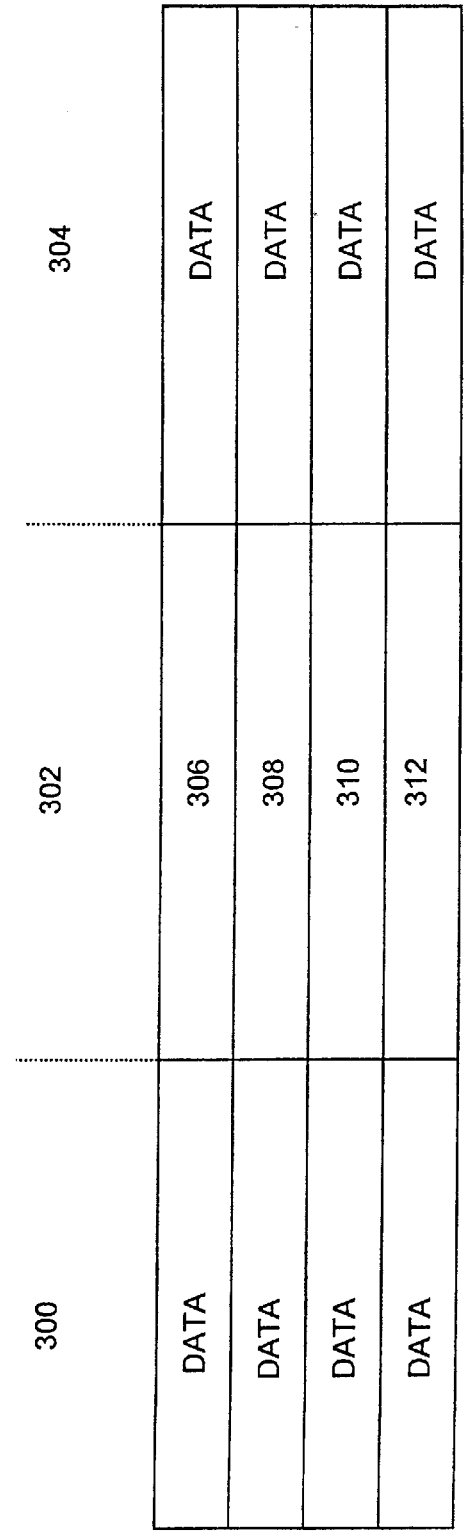
FIG. 3 shows an example of a burst structure for USF coding according to the invention.

The different bursts of the block may comprise a different number of possible training sequence alternatives. FIG. 3 illustrates a burst structure for USF coding according to the invention. Four bursts of a block are shown. The burst structure is divided into sequences. The first and the last sequences 300 and 304 of modulated information include data sequences. The middle sequence 302 comprises the training sequences. Each training sequence is one of n alternatives. The training sequences of the middle sequence 302 include e.g. a training/modulation indicator 306, which is preferably the first sequence, which is followed by part 1 of coded USF (training/part 1 of coded USF) 308, part 2 of coded USF (training/part 2 of coded USF) 310 and part 3 of coded USF (training/part 3 of coded USF) 312.

Coding of uplink state flags by the method of the invention has the following advantages, for example. Since a large number of symbols are used in coding of uplink state flags, coding is relatively efficient. Thanks to its efficiency, coding allows to assign the same time slot both to the subscriber terminals close to the base station and to the terminals far away from it. Coding enables better throughput because it is not necessary to reserve data bits for coding of uplink state flags, and thus coding saves preferably approximately three symbols per burst, for instance. Coding can also be easily implemented in the case of different coding rates and modulations.

Even though the invention has been described above with reference to the example according to the accompanying drawings, it is clear that the invention is not restricted thereto, but it may be modified in various ways within the inventive concept disclosed in the appended claims.

What is claimed is:

1. A coding method of signalling information in a packet radio system, which comprises at least one base station (112) and subscriber terminal (150), in which signals to be transmitted on a radio connection (170) between the base station (112) and the subscriber terminal (150) form blocks, which comprise bursts consisting of symbols, the burst comprising a training sequence (302) in which modulation information is included, characterized in that signalling information is coded together with the modulation information relating to the whole block into the training sequences (302) of the block.

2. A method according to claim 1, characterized in that the modulation information relating to the whole block is included only in some of the training sequences (302) included in the bursts of the block of the packet radio system, and that signalling information is coded into the other training sequences (302) of the block.

3. A method according to claim 1, characterized in that uplink state flags are coded in the training sequences (302) of the packet radio system.

4. A method according to claim 2, characterized in that modulation information is included only in the first burst of the block.

5. A method according to claim 1, characterized in that the bursts are demodulated immediately after they have been received.

6. A method according to claim 1, characterized in that the bursts following the first burst are demodulated using the same modulation method as in the demodulation of the first burst.

7. A method according to claim 1, characterized in that the training sequences (302) of the bursts following the first burst are used for transmitting block-coded uplink state flags.

8. A method according to claim 1, characterized in that the training sequences (302) of the bursts following the first bursts are used for signalling other than burst modulation.

9. A packet radio system, which comprises at least one base station (112) and subscriber terminal (150), in which the signals to be transmitted on a radio connection (170) between the base station (112) and the subscriber terminal (150) form blocks, which comprise bursts consisting of symbols, the bursts comprising a training sequence (302) in which modulation information is included, characterized in that the packet radio system is arranged to code signalling information together with the modulation information relating to the whole block into the training sequences (302) of the block.

10. A packet radio system according to claim 9, characterized in that the packet radio system is arranged to include the modulation information relating to the whole block only in some of the training sequences (302) the bursts of the block include, and that the packet radio system is arranged to code signalling information into the other training sequences (302) of the block.

11. A packet radio system according to claim 9, characterized in that the packet radio system is arranged to code uplink state flags in the training sequences (302) of the packet radio system.

12. A packet radio system according to claim 10, characterized in that the packet radio system is arranged to include modulation information only in the first burst of the block.

13. A packet radio system according to claim 9, characterized in that the system is arranged to demodulate the bursts immediately after they have been received.

14. A packet radio system according to claim 9, characterized in that the system is arranged to demodulate the bursts following the first burst using the same modulation method as in the demodulation of the first burst.

15. A packet radio system according to claim 9, characterized in that the training sequences (302) of the bursts following the first burst are arranged to transmit block-coded uplink state flags.

16. A packet radio system according to claim 9, characterized in that the packet radio system is arranged to use the training sequences (302) of the bursts following the first burst for signalling other than burst modulation.

* * * * *